(12) United States Patent
Markiewicz et al.

(10) Patent No.: US 11,144,515 B2
(45) Date of Patent: Oct. 12, 2021

(54) EFFICIENT CLUSTERED PERSISTENCE

(71) Applicant: Microsoft Technology Licensing, LLC, Redmond, WA (US)

(72) Inventors: Marcus Eduardo Markiewicz, Teaneck, NJ (US); Tai T. Do, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 16/522,327

(22) Filed: Jul. 25, 2019

(65) Prior Publication Data
US 2020/0379957 A1    Dec. 3, 2020

Related U.S. Application Data

(60) Provisional application No. 62/854,517, filed on May 30, 2019.

(51) Int. Cl.
*G06F 16/18* (2019.01)
*G06F 16/28* (2019.01)

(52) U.S. Cl.
CPC ........ *G06F 16/1873* (2019.01); *G06F 16/285* (2019.01)

(58) Field of Classification Search
CPC .... G06F 16/1873; G06F 16/285; G06F 16/28; G06F 16/18; G06F 16/283; G06F 16/213; G06F 16/2264
USPC ....................................................... 707/695
See application file for complete search history.

(56) References Cited

U.S. PATENT DOCUMENTS

| | | | | |
|---|---|---|---|---|
| 5,745,749 | A * | 4/1998 | Onodera | G06F 3/0626 |
| 6,377,958 | B1 * | 4/2002 | Orcutt | G06F 16/116 |
| | | | | 707/690 |
| 7,293,027 | B2 * | 11/2007 | Margolus | G06F 16/2358 |
| 2015/0134711 | A1 * | 5/2015 | Srinivas | G06F 16/134 |
| | | | | 707/828 |
| 2020/0379957 | A1 * | 12/2020 | Markiewicz | G06F 16/285 |

OTHER PUBLICATIONS

"International Search Report and Written Opinion Issued in PCT Application No. PCT/US2020/026596", dated Jun. 24, 2020, 11 Pages.
"Default Cluster Size for NTFS, FAT, and exFAT", Retrieved from: https://support.microsoft.com/en-us/help/140365/default-cluster-size-for-ntfs-fat-and-exfat, Retrieved Date: Jan. 28, 2020, 5 Pages.

(Continued)

*Primary Examiner* — Kuen S Lu
(74) *Attorney, Agent, or Firm* — Schwegman Lundberg & Woessner, P.A.

(57) ABSTRACT

The systems and methods disclosed herein relate to using the clusters of a file to store versioning of a dataset. When the dataset is initially stored, a file is created that is twice the size of the dataset. The file may include one cluster (or a first set of clusters) that is marked as active and a second cluster (or a second set of clusters) that are marked inactive. The dataset is initially saved to the active cluster(s), and a version number is stored with the dataset. When the dataset is next saved, an application scans the file to determine whether there is (or are) an inactive cluster(s). If there is an inactive cluster(s) the second version of the dataset is saved to the inactive clusters. Both clusters are then marked active.

20 Claims, 12 Drawing Sheets

(56) References Cited

OTHER PUBLICATIONS

Watumull, Garrett, "Cluster Size Recommendations for ReFS and NTFS", Retrieved from: https://techcommunity.microsoft.com/t5/storage-at-microsoft/cluster-size-recommendations-for-refs-and-ntfs/ba-p/425960, Jan. 13, 2017, 5 Pages.

* cited by examiner

FIG. 5A

| 502 | 504 | 506 | 508 |
|---|---|---|---|
| (0,0) | (0,0) | | |

| 502 | 504 | 506 | 508 | 510 | 512 |
|---|---|---|---|---|---|
| (0,0) | (0,0) | (1,0) | | | |

| 502 | 504 | 506 | 508 | 510 | 512 |
|---|---|---|---|---|---|
| (0,0) | (0,0) | (1,0) | | (0,1) | (0,1) |

220C

| 502 | 504 | 506 | 508 | 510 | 512 | 514 | 516 |
|---|---|---|---|---|---|---|---|
| (0,0) | (0,0) | (1,0) | (2,0) | (0,1) | (0,1) | | |

| 502 | 504 | 506 | 508 | 510 | 512 | 514 | 516 |
|---|---|---|---|---|---|---|---|
| (0,2) | (0,2) | (1,0) | (2,0) | (0,1) | (0,1) | | |

EFFICIENT CLUSTERED PERSISTENCE

CROSS-REFERENCE TO RELATED APPLICATIONS

This application claims the benefit of priority to U.S. Pat. App. No. 62/854,517, titled "EFFICIENT CLUSTERED PREFERENCE" and filed May 30, 2019, the disclosure of which is incorporated by reference herein in its entirety.

TECHNICAL FIELD

The subject matter disclosed herein generally relates to improving read and write operations of a computing device by utilizing the manner in which a filesystem manages the clusters of a file for storing and retrieving data.

BACKGROUND

In a computing device where persisting small datasets (e.g., small number of bytes per input/output (I/O) request) at a high frequency is required, there are performance and durability challenges. For example, durability problems can arise if the datasets are co-located in a same file and are changed at independent rates. These problems can lead to the possibility of a "torn write," which is a situation where a portion of the file contains an incomplete dataset and another portion of a file contains a different, incomplete dataset. Thus, a typical solution is not to co-locate datasets and to store such datasets in different files. However, this typical solution has several problems, which include a performance penalty when reading and writing, where a number of IO requests can be proportional to the amount of data in the datasets being read and/or written.

SUMMARY

To address these and other problems that arise within the field of data durability, this disclosure provides a mechanism for limiting the number of random I/O operations for optimal performance while maintaining durability guarantees regardless of an update to one or more datasets.

In one embodiment, a dataset is maintained in a single file, which allows for sequential I/O operations at read time. Furthermore, a single file may contain multiple datasets. This implementation has a technical benefit of reducing, or altogether obviating, the performance penalty of a dataset that requires one or more random I/O operations. In one embodiment, each file that is designated to store one or more datasets is divided into file clusters, where the file is sized to a designated file size. In one embodiment, the designated file size is twice the size of the number of clusters being used by the datasets.

A dataset may include administrative data used to remotely access or retrieve a file, electronic document, digital video, or other data remotely stored. The administrative data may include digital rights management (DRM) information, such as an encryption key, decryption key, hash, password, or other such DRM information. The administrative data may be locally stored on a computing device (e.g., on a local computer storage device) so that the computing device can readily access the administrative data to retrieve and/or store a file that is remotely accessible.

To perform changes within a file, the disclosed systems and methods may operate on a cluster-by-cluster basis. As one of ordinary skill in the art will understand, a cluster is typically a minimum allocation unit provided by a filesystem of an operating system. Changing any disk sectors within a cluster can affect data in the other blocks of the same cluster, which can break the durability of the dataset. Accordingly, in one embodiment, the I/O operations described herein are non-cached, write-through I/O operations, which may be performed asynchronously. If it is guaranteed that changes for a dataset are not co-located with another dataset in a same cluster, durability at a dataset granularity level is achieved.

In some instances, the clusters of a file used to store datasets may be differently sized depending on the operation system and/or filesystem. For example, a cluster size of 64 kilobyte (KB) guarantees durability for Resilient File System (ReFS), New Technology File System (NTFS), a File Allocation Table filesystem (FAT) filesystem, and/or an Extended File Allocation Table (exFAT) filesystem. As another example, a cluster size of 4 KB may be implemented where the file system is a journaling file system, such as ext4, the Hierarchical File System Plus (HFS+), and/or the Apple File System (APFS).

In one embodiment, the disclosed systems and methods may initially determine a cluster size based on a disk geometry. For example, a software application or other module may execute a function or other procedural call to obtain the disk geometry for a computing device. In some instances, where the cluster size cannot be determined, a dataset size of 64 KB per cluster may be implemented to avoid unintentionally affecting another dataset. Although a 64 KB per cluster implementation may not be used in every instance, a technical advantage of using a 64 KB cluster implementation is avoiding write amplification from causing durability issues in certain types of computer storage devices, such as solid-state drives (SSDs).

During execution of an application, a dataset may be updated with additional information or may be replaced with a newer version of the dataset. In one embodiment, where an update to the dataset is obtained, the entirety of the dataset is re-written to corresponding clusters of the file where the older version of the dataset is stored. After the updated dataset is written to the clusters of the corresponding file, the written data may be verified (e.g., via error correction coding (ECC)) to ensure that the updated dataset was properly written. This feature assists in the detection of torn writes (e.g., where the written updated dataset cannot be verified).

In addition, at each writing of a given dataset, the dataset may be associated with a corresponding version number. For example, a sector of the cluster in which the dataset is written may be designated for storing the version number of the written dataset. The version number may be monotonically increasing with each writing of the dataset. The stored version number assists in the determination of which dataset for a given file is the latest (e.g., most recent) dataset.

When an update to a dataset occurs, the associated version number of the dataset may be increased to reflect that the update occurred. In addition, a first attempt may be made to write the updated dataset to "blank" or unused clusters of the file; where "blank" or "unused clusters" are not available, an older version of the dataset may be overwritten with the updated dataset. In addition, the number of versions of the dataset that a file contains may be configurable, such that a file may store multiple versions of a dataset. In one embodiment, a file is configured to store two versions of a dataset. In this embodiment, the older of the two versions of the dataset is overwritten first. A version of a dataset that is older than the number of versions a file is configured to store may be considered "obsolete."

In one embodiment, to be considered obsolete, the dataset stored by a particular cluster is an N−2 of the version of the dataset being written. A value of N−2 is used because, if the N version being written is torn on write, the N−1 version is still present and intact. In yet a further embodiment, for any cluster being written, all clusters containing an N−2 version of dataset may be considered obsolete.

In some instances, a file may include multiple datasets where only a particular dataset is being updated. In this regard, only the particular dataset may be updated. Thus, the unchanged datasets may be left untouched. Further still, clusters for a same dataset may be written contiguously so as to preserve data integrity. In addition, should a file not contain a sufficient number of clusters to store an updated dataset, the file may be extended (e.g., additional clusters may be allocated to the file) to accommodate the increased size of the dataset. In one embodiment, a file is pre-sized in an attempt to reduce the number of times a file is likely to be extended.

As an application or other software and/or hardware may be unfamiliar with the datasets that a file stores, a file may be read in its entirety to determine the datasets that the file stores and the versions of such datasets. Where the file is small (e.g., less than four clusters) and/or contains a limited number of datasets (e.g., two datasets), the file may be read in a single, sequential I/O operation.

In some embodiments, the disclosed systems and methods may implement a mechanism or other software-based architecture to track the datasets in use and/or the most recent (e.g., active) versions of the datasets. In one implementation, an in-memory map comprises the disk extents of the latest versions of one or more datasets. The in-memory map may include such information as a dataset identifier (e.g., information that identifies a particular dataset), the latest (e.g., most recent) version of the dataset, the file in which the dataset resides, and/or the cluster(s) within the file where the latest version of the dataset may be located. The in-memory map may be referenced to determine which datasets should not be deleted, edited, overwritten, or otherwise modified.

BRIEF DESCRIPTION OF THE DRAWINGS

Some embodiments are illustrated by way of example and not limitation in the figures of the accompanying drawings.

FIGS. 5A-5E illustrate the operations of updating multiple datasets within a file residing on the computing device of FIG. 2, according to an example embodiment.

FIGS. 6A-6E illustrate the operations of resizing a file residing on the computing device of FIG. 2, according to an example embodiment.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Figure 1:
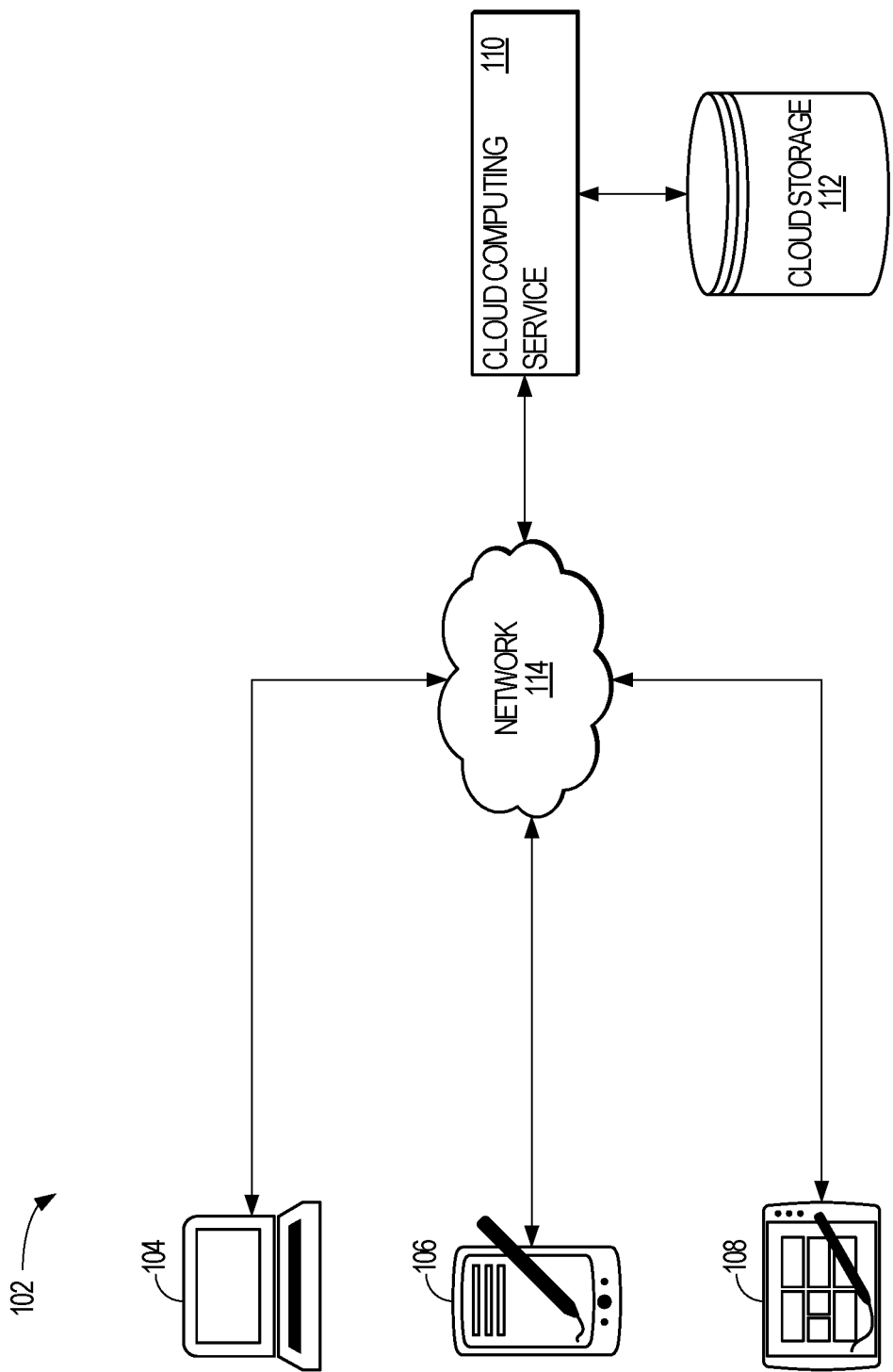
FIG. 1 is a block diagram illustrating a networked system that includes various types of computing devices in communication with a cloud computing service, according to an example embodiment.

FIG. 1 is a block diagram illustrating a networked system 102 where computing devices 104-108 are in communication with a cloud computing service 110 via a network 114. The cloud computing service 110 is communicatively coupled with a cloud storage 112. The computing devices 104-108 may retrieve and/or send data to and from the cloud computing service 110 via the network 114. In turn, the cloud computing service 110 may store and/or retrieve data from cloud storage 112 and provide the stored and/or retrieved data to the computing devices 104-108.

The computing device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user may utilize to perform various computing tasks (e.g., accessing the Internet, making a phone call, conducting a video conference, etc.). In some embodiments, the computing device 104 may comprise a display module (not shown) to display information (e.g., in the form of user interfaces). In further embodiments, the computing device 104 may comprise one or more of touch screens, accelerometers, gyroscopes, cameras, microphones, global positioning system (GPS) devices, and so forth.

The cloud computing service 110 provides one or more services and/or functions to the computing devices 104-108 via the network 114. In general, cloud computing refers to the on-demand availability of computer system resources, such as data storage and computing power, without direct active management by a user that uses such resources. A cloud computing service generally refers to a computer system resource that is provided to one or more users via a Wide Area Network, such as the Internet. In some instances, a cloud computing service may provide the computer system resources by employing multiple servers distributed over one or more locations. One example of a cloud computing service is Microsoft® Azure, which provides such services as database services, virtual machines, application development services, websites, and data storage services. The cloud computing service 110 may be communicatively coupled to a cloud storage 112, which stores data (e.g., software libraries, electronic documents, application development projects, etc.), and applications that may be accessed by the computing devices 104-108 via the cloud computing service 110.

The computing devices 104-108 and the cloud computing service 110 may be implemented as a client/server relationship (e.g., computing devices 104-108 are client devices\cloud computing service 110 is a server device), as a peer-to-peer relationship (e.g., computing devices 104-108 are communicatively connected as peer devices), or a server-to-server relationship (e.g., the computing devices 104-108 are implemented as servers and communicate with each other and/or the cloud computing service 110 to provide various services to one another).

The network 114 disposed between the computing devices 104-108 and the cloud computing service 110 may include one or more types of networks. For example, the network 114 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

As mentioned above, the cloud computing service 110 may store electronic documents via the cloud storage 112 and accessible by the computing devices 104-108. The cloud computing service 110 may securely store the electronic documents such that a user of the computing devices 104-108 is required to authenticate himself or herself before retrieving and/or accessing the electronic documents. Authentication mechanisms may include biometric information, a username and password, a secret phrase, and/or any other kind of authentication mechanism.

When authenticated the user may access the electronic documents stored in the cloud storage 112. In addition, each of the electronic documents may be associated with administrative data that ensures the confidentiality, integrity, and/or security of the accessed electronic documents. Such administrative data may include, but is not limited to, encryption and/or decryption keys, one or more hash files, partial and/or complete backups of the accessed electronic documents, metadata relating to the accessed electronic documents, and other such administrative data or combinations thereof. The administrative data may be stored on the computing device accessing the cloud computing service 110 such that the computing device may more readily access the administrative data. As discussed below, the administrative data may be stored in one or more clusters of a file for faster retrieval by a computing device 104-108.

Administrative data relating to a particular file may be considered a dataset and, in instances where the administrative data changes or is updated, a particular file may be associated with multiple datasets. Thus, in some instances, a single file may store multiple datasets. In addition, and one in embodiment, each electronic document is associated with its own file. Thus, a single file may only contain administrative data for a particular electronic document. However, in another embodiment, a single file may contain administrative data for multiple documents. As discussed below with references to FIGS. 3A-6E, a computing device may manipulate the clusters of a file in storing and/or updating a particular dataset.

Figure 2:
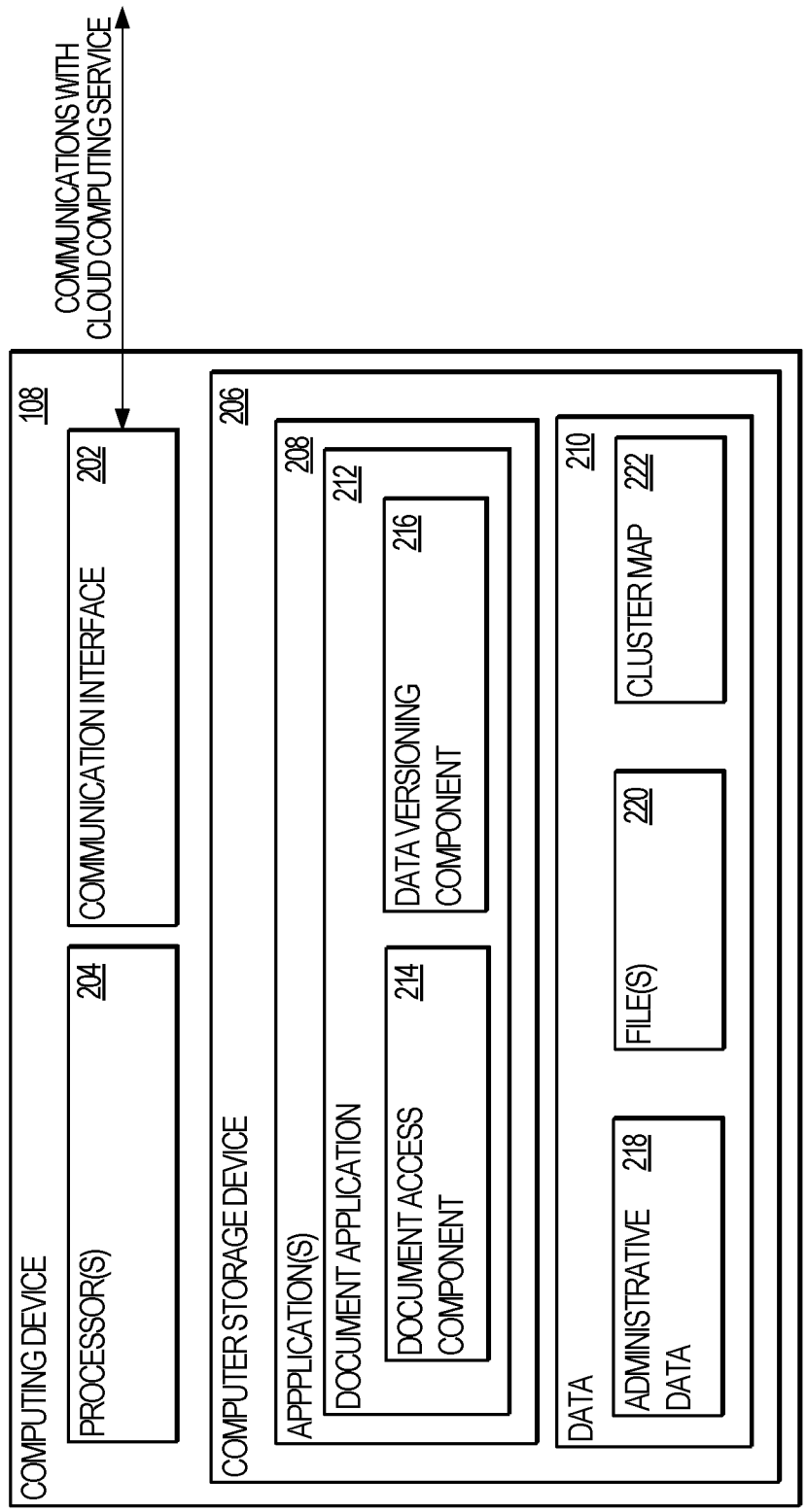
FIG. 2 illustrates the components of a computing device illustrated in FIG. 1, according to an example embodiment.

FIG. 2 illustrates the components of a computing device 104 illustrated in FIG. 1, according to an example embodiment. As shown in FIG. 2, and in one embodiment, the computing device 108 includes various components 202-222. These components 202-222 include, but are not limited to, a communication interface 202, one or more processor(s) 204, a computer storage device 206, various application(s) 208 and data 210 that may be used by, and/or supports, the application(s) 208.

The various component 202-222 of the computing device 108 may be implemented in a single device may reside on a single device or may be distributed across several devices in various arrangements. The various components 202-222 of the computing device 108 may access one or more computer storage devices for configuration information and/or implementation algorithms, and each of the various components 202-222 may be in communication with one another (e.g., via one or more communication buses or the like). Further, while the components 202-222 of FIG. 2 are discussed in the singular sense, it will be appreciated that in other embodiments multiple instances of the components 202-222 may be employed.

One or more of the components 208-222 may be implemented in hardware and/or software. In one embodiment, the components 208-222 are implemented as dedicated circuits, such as Application Specific Integrated Circuits (ASICs) where the dedicated circuits are configured to perform predetermined functions. Additionally, and/or alternatively, the components 208-222 may be implemented as software, where the processor(s) 204 are configured to execute computer-readable instructions that implement the components 208-222. Furthermore, combinations of the foregoing are possible, where some components are implemented as dedicated circuits and other modules are implemented in software. In this manner, the computing device 108 may include components 208-222 that are implemented in hardware and/or software.

The communication interface 202 is configured to communicate with the cloud computing service 110 and/or one or more of the other computing devices 104-106. In this regard, communication with the cloud computing service 110 includes receiving data from the cloud computing service 110 and/or sending data to the cloud computing service 110. Examples of data communicated between the computing device 108 and the cloud computing service 110 include one or more electronic documents (not illustrated in FIG. 2) and the administrative data 218 that is associated with the electronic documents. While the administrative data 218 relates to an electronic document, one of ordinary skill in the art will appreciate that the disclosed techniques or not solely limited to administrative data, but may be used for any type of information, such as customer information, product information, weather information, or other types of information.

The communication interface 202 may include one or more wired and/or wireless communication interfaces. For example, the communication interface 202 may include a wireless transceiver, a Bluetooth® radio, and/or a wired network interface. In one embodiment, the communication interface 202 is configured to establish a wireless communication channel with the cloud computing service 110 using one or more wireless communication protocols such as 802.11 b/g/n. Additionally, and/or alternatively, the computing device 108 may establish a communication channel with the cloud computing service 110 via a wire or other physical medium (e.g., via an Ethernet cable or the like).

The processor(s) 204 are configured to execute computer-readable instructions that implement one or more of the application(s) 208. Additionally, and/or alternatively, the processor(s) 204 may be configured to retrieve computer-readable instructions from the computer storage device 206. The one or more processor(s) 204 may be any type of commercially available processor, such as processors available from the Intel Corporation, Advanced Micro Devices, Texas Instruments, or other such processors. Further still, the one or more processor(s) 204 may include one or more special-purpose processors, such as a Field-Programmable Gate Array (FPGA) or an Application Specific Integrated Circuit (ASIC). The one or more processor(s) 204 may also include programmable logic or circuitry that is temporarily configured by software to perform certain operations. Thus, once configured by such software, the one or more processor(s) 204 become specific machines (or specific components of a machine) uniquely tailored to perform the configured functions and are no longer general-purpose processor(s) 204.

Where the one or more processor(s) 204 implement the modules 208-216 via one or more computer-readable instructions, the computer-readable instructions may be written in one or more computer-programming and/or computer-scripting languages. Examples of such languages include, but are not limited to, C, C++, C #, Java, JavaScript, Perl, Python, or any other computer programming and/or scripting language now known or later developed.

The computing device 108 may further include various computer storage device(s) 206 and/or computer-readable medium(s) for storing the application(s) 208 and/or the data 210. The computer storage device 206 includes one or more physical devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer storage device" should be taken to include a single device or multiple devices (e.g., a centralized or distributed database, or associated caches and servers) able to store the application(s) 208 and the data 210. Accordingly, the computer storage device 206 may be implemented as a single storage apparatus or device, or, alternatively and/or additionally, as "cloud-based" storage systems or storage networks that include multiple storage apparatus or devices.

The application(s) 208 include an operating system (not shown) and a document application 212 used to retrieve, store, and/or edit electronic documents stored by the cloud computing service 110. One example of a document application 212 is Microsoft® Word®, which allows a user of the computing device 108 to edit electronic documents stored in various formats including, but not limited to, TXT, DOCX, DOC, RTF, ODT, and other such formats or combinations thereof.

The document application 212 includes various sub-components 214-216 that provide various functionalities to the document application 212. One component is a document access component 214, which allows the document application 212 to access the cloud computing service 110. In addition, the document access component 214 may allow the document application 212 to read, parse, and understand an electronic document stored in a particular format.

The document application 212 is extensible via various plug-ins, modules, and libraries that extend the functionalities of the document application 212. For example, the document application 212 may be extended using one or more development platforms, such as the Component Object Model (COM), Visual Basic, Microsoft Office Developer, the Visual Studio Tools for Office (VSTO), the Office Add-ins Platform, or combinations thereof. As known to one of ordinary skill in the art, the foregoing platforms allow a programmer or developer to develop a small application (e.g., an "add-in") that extends the functionalities of the document application 212, and allow the document application 212 to perform different and/or additional functions from the document application's 212 initial state.

In one embodiment, the document application 212 includes additional components for accessing, retrieving, and/or storing one or more electronic documents from the cloud computing service 110. The additional components may include a document access component 214 and a data versioning component 216. The data access component 214 is configured to access and/or retrieve one or more electronic documents from the cloud computing service 210 via the communication interface 202 and the network 114.

When the document access component 214 retrieves an electronic document, the document application 212 and/or the cloud computing service 110 may generate or obtain administrative data 218 associated with the retrieved electronic document. To store and maintain the administrative data 218, the document application 212 includes a data versioning component 216 that maintains and tracks the administrative data 218 to ensure that the computing device 108 has the latest version of the administrative data 218. In addition, the data versioning component 216 is configured to retain prior versions of the administrative data 218 to ensure data accessibility in the event that a current version of the administrative data 218 becomes corrupt or that a prior version of the administrative data 218 is required.

As discussed with reference to FIGS. 3A-6E, below, the data versioning component 216 may leverage the file system of the computing device 108 to store the administrative data 218. Accordingly, the data 210 includes one or more file(s) 220 that store the administrative data 218. More particularly, the data versioning component 216 is configured to store the administrative data 218 in particular clusters of the file(s) 220. To maintain a list of the active (e.g., most recent) versions of the administrative data 218, the data versioning component 216 may implement an in-memory cluster map 222 that associates the most recent version of administrative data 218 with their respective file(s) 220 and/or clusters within the file(s) 220. As discussed previously, the technical benefit of this approach is that the data versioning component 216 can rapidly access and update the administrative data 218 as the changes to the administrative data 218 are occurring at the file system level while preserving the data integrity of the administrative data 218.

Figure 3A:
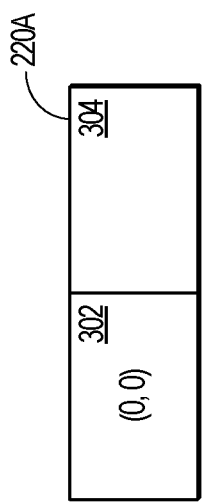
FIGS. 3A-3C illustrate the operations of storing a dataset within a file residing on the computing device of FIG. 2, according to an example embodiment.
Figure 3B:
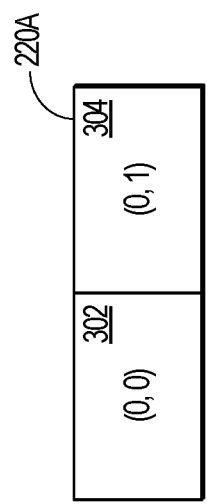
Figure 3C:
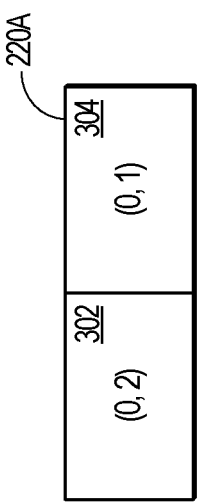

FIGS. 3A-3C illustrate the operations of storing a dataset within a file 220A residing on the computing device 108 of FIG. 2, according to an example embodiment. Initially, the data versioning component 216 receives administrative data 218 having a size of one cluster. To accommodate additional versions of the dataset, the data versioning component 216 creates a file of twice the size of the administrative data 218 (e.g., having two clusters). As shown in FIGS. 3A-3C, the file 220A includes a first cluster 302 and a second cluster 304. However, in alternative implementations, the number of clusters that are created may be configurable, such that the data versioning component creates a file having a number of clusters equal to the configured size. Thus, the file 220A may have three times the number of clusters required by the administrative data 218, four times the number of clusters required by the administrative data 218, and so forth.

In FIG. 3A, the data versioning component 216 writes a first dataset to cluster 302, where the version of the dataset is "0" and the dataset is identified as dataset "0." In FIG. 3B, the data versioning component 216 receives an update to the dataset. For example, a change in the administrative data 218 may occur during the time in which the computing device 108 retrieved a particular electronic document. In response, the data versioning component 216 scans the file 220A to determine whether any cluster contains an "obsolete" version of the dataset and/or whether any one of the clusters 302-304 are empty (e.g., contain a NULL value or zero value). The data versioning component 216 has determined that the second cluster 304 is empty and/or otherwise available, and has written an updated version of the dataset to the second cluster 304. The updated version of the dataset includes a "1" to indicate that the dataset replaces the dataset associated with the version number of "0." In one embodiment, the version number may be written to a particular sector within the cluster 304.

In FIG. 3C, the document application 212 receives yet another update to the administrative data 218. Accordingly, the data versioning component 216 determines whether one or more clusters 302-304 of the file 220A are available. In one embodiment, the data versioning component 216 retrieves the version number associated with each of the datasets. Further still, in this example, the data versioning component 216 determines that the first cluster 302 contains an obsolete dataset. The data versioning component 216 may perform this determination by comparing the version number of the dataset with a configured obsolete version variable that indicates when a dataset is considered to be obsolete. Having determined that the dataset in the first cluster 302 is obsolete, the data versioning component 216 writes the updated dataset to the first cluster 302, along with a data version of "2" to indicate that the dataset is the most recent version of the dataset. In addition, the data versioning component 216 may update the cluster map 222 to show the location of the most recent version of the dataset associated with the dataset identifier of "0."

Figure 4A:
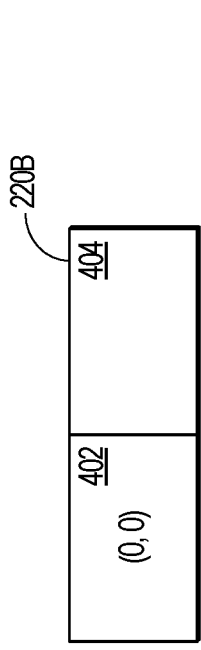
FIGS. 4A-4D illustrate the operations of storing multiple datasets within a file residing on the computing device of FIG. 2, according to an example embodiment.

FIGS. 4A-4D illustrate the operations of storing multiple datasets within a file residing on the computing device of FIG. 2, according to an example embodiment. Referring initially to FIG. 4A, the data versioning component 216 creates a file 220B having twice the number of clusters than the size of the administrative data 218. In the embodiment shown in FIG. 4A, the data versioning component 216 creates the file 220B having a first cluster 402 and a second cluster 404, where the data versioning component 216 stores a first version (e.g., version "0") of a first dataset (identified as dataset "0") in the first cluster 402.

Figure 4B:
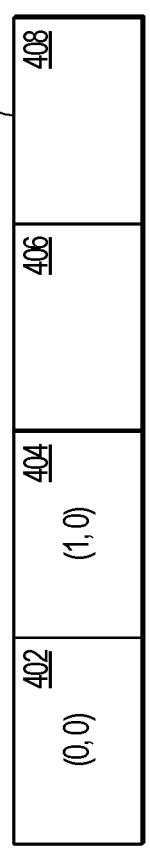

In FIG. 4B, the document application 212 receives a second dataset, identified as dataset "1," where dataset "1" is one cluster in size. Accordingly, the document application 212 invokes the data versioning component 216 to handle the updated dataset. In response, the data versioning component 216 increases the number of clusters in file 220B to accommodate the second dataset. Thus, the file 220B includes the first cluster 402, the second cluster 404, a third cluster 406, and a fourth cluster 408. The second dataset may be associated with the same electronic document as the first dataset or the second dataset may be associated with a different electronic document. The data versioning component 216 may also update the cluster map 222 to include the location of the second dataset.

Figure 4C:
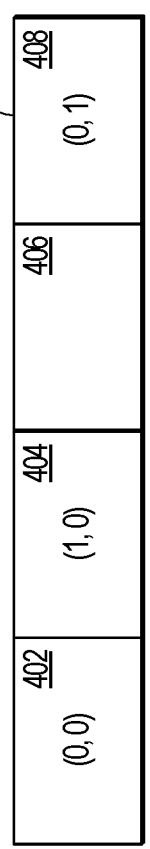

In. FIG. 4C, the document application 212 receives an update to the first dataset. In response, the data versioning component 216 scans the file 220B to identify an available cluster and/or cluster containing an obsolete version of the dataset. As shown in FIG. 4C, the data versioning component 216 has identified that cluster 408 is available. Accordingly, the data versioning component 216 writes the updated first dataset to the cluster 408 along with an increase in the version number to indicate that the first dataset in the cluster 408 is the most recent version of the first dataset. The data versioning component 216 may further update the cluster map 222 to reflect the location of the updated version of the first dataset.

Figure 4D:
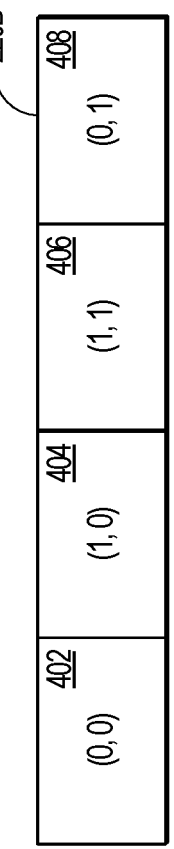

In FIG. 4D, the document application 212 has received an update to the second data (e.g., the second dataset stored in cluster 404). Accordingly, the data versioning component 216 scans the file 220B to identify an available cluster and/or cluster containing an obsolete version of the second dataset. As shown in FIG. 4D, the data versioning component 216 has identified that cluster 406 is available. Accordingly, the data versioning component 216 writes the updated second dataset to the cluster 406 along with an increase in the version number to indicate that the second dataset in the cluster 406 is the most recent version of the second dataset. The data versioning component 216 may further update the cluster map 222 to reflect the location of the updated version of the second dataset.

FIGS. 5A-5E illustrate the operations of updating multiple datasets within a file residing on the computing device of FIG. 2, according to an example embodiment. In FIG. 5A, the document application 212 has received a first dataset that is two clusters in size. Accordingly, the data versioning component 216 creates a file 220C that is four clusters in size such that the file 220C has a first cluster 502, a second cluster 504, a third cluster 506, and a fourth cluster 508. The data versioning component writes the first dataset to the first cluster 502 and the second cluster 504, along with a version number (e.g., "0") of the first dataset stored in the first and second clusters 502-504. The data versioning component 216 may then update the cluster map 222 with the location of this first version of the first dataset.

In FIG. 5B, the document application 212 has received a second dataset having a size of one cluster. As twice the size of the datasets would be six clusters, the data versioning component 216 determines that the initial size of the file 220C is too small (e.g., four clusters) and, thus, resizes the file 220C to six clusters. Accordingly, in FIG. 5B, the file 220C includes two additional clusters—a fifth cluster 510 and a sixth cluster 512. The data versioning component 216 then writes the first version of the second dataset to the third cluster 506. The data versioning component 216 may write the second dataset to the third cluster 506 so that the first version of the first dataset and the first version of the second dataset occupy contiguous clusters. Having the datasets in contiguous clusters provides a technical benefit of reduced I/O operations, as the data versioning component 216 reads the datasets stored in clusters 504-506 rather than having to jump to other clusters within the file 220C. In addition, the data versioning component 216 may then update the cluster map 222 with the location of this first version of the second dataset.

In FIG. 5C, the document application 212 has received an update to the first dataset. Accordingly, the data versioning component 216 scans the file 220C to determine whether there are clusters available for writing the updated dataset.

As shown in FIG. 5C, the data versioning component 216 writes the second version of the first dataset to the fifth and sixth clusters 510-512. The data versioning component 216 may then update the cluster map 222 with the location of this second version of the first dataset.

Referring to FIG. 5D, the document application 212 has received a third dataset (identified with the dataset identifier of "2") of one cluster in size. The data versioning component 216 then determines whether the file 220C has a sufficient number of clusters to write the additional dataset. In one embodiment, the data versioning component 216 determines that the file 220C does not include a sufficient number of clusters because the number of clusters in the file 220C at the time the third dataset is received is less than twice the total number of clusters needed to store all of the datasets. In this example, the data versioning component 216 determines that the file 220C requires eight clusters to store the datasets (e.g., four clusters for storing a current version of each of the datasets and four clusters for storing the prior and/or next update of the datasets). Accordingly, as shown in FIG. 5D, the data versioning component resizes the file 220C to include an additional seventh cluster 514 and an eighth cluster 516. The data versioning component 216 then stores the third dataset in the fourth cluster 508, which is the first available cluster in the file 220C, and then updates the cluster map 222 accordingly.

In FIG. 5E, the document application 212 receives yet another update to the first dataset (e.g., the dataset with the identifier of "0"). Accordingly, the data versioning component 216 scans the file 220C to determine whether the file 220C includes an obsolete version of the first dataset (e.g., by comparing a version of the dataset with the configured obsolete version variable). Based on this scan, the data versioning component 216 determines that the first and second clusters 502-504 include an obsolete version of the first dataset. The data versioning component 216 then overwrites the first and second clusters 502-504 with the third version of the first dataset, updates the version number associated with the first dataset (e.g., shown in FIG. 5E with a version number of "2"), and then updates the cluster map 222 to associate the location of the first dataset (e.g., the first and second clusters 502-504 and/or file 220C) with the most recent version of the first dataset.

FIGS. 6A-6E illustrate the operations of resizing a file residing on the computing device of FIG. 2, according to an example embodiment. Initially, the document application 212 receives administrative data 218 (e.g., a first dataset) having a size that requires one cluster to store (e.g., the administrative data 218 is less than or equal to one cluster in size). Accordingly, the data versioning component 216 creates a file having twice as many clusters as needed to store the administrative data 218. In this manner, a file 220D includes a first cluster 602 and a second cluster 604. The data versioning component 216 stores a first version of the dataset in the first cluster 602, where the data versioning component 216 records a version number of "0" in the cluster 602 to indicate that the first version of the dataset having a dataset identifier of "0" is stored in the first cluster 602. The data versioning component 216 then updates the cluster map 222 to associate the first cluster 602 as the location of the most recent version of the first dataset.

Figures 6A, 6B, 6C:
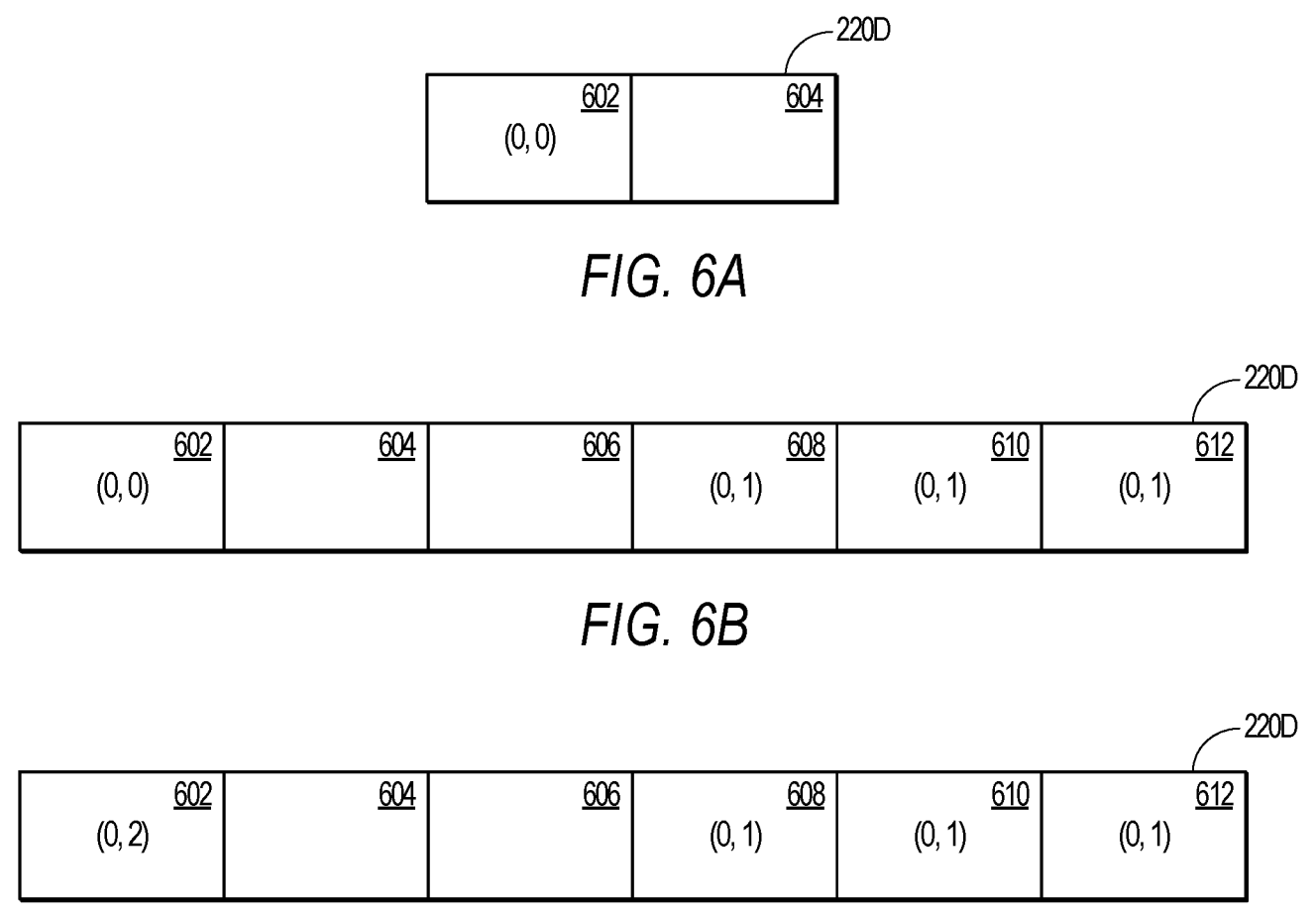

Referring next to FIG. 6B, the document application 212 then receives (and/or generates) a second version of the first dataset (e.g., a more recent version of the first dataset of administrative data 218) that requires at least three clusters to store. The data versioning component 216 scans the file 220D to determine that the file 220D does not have a sufficient number of clusters to store the latest version of the first dataset. As there are no other additional datasets stored in the file 220D, the data versioning component 216 is configured to extend the file 220D to twice the number of clusters required to store the second version of the first dataset. In other words, the data versioning component 216 is configured to extend the number of clusters in the file 220D based on the number of datasets stored in the file and the number of clusters required to store each of the datasets. Accordingly, the data versioning component 216 extends the file 220D to include six clusters—the first cluster 602, the second cluster 604, a third cluster 606, a fourth cluster 608, a fifth cluster 610, and a sixth cluster 612. The data versioning component 216 then stores the second version of the dataset in the fourth, fifth, and sixth clusters 608-612, and updates the cluster map 222 to associate the clusters 608-612 as the location of the most recent version of the first dataset.

Turning next to FIG. 6C, the document application 212 has received and/or generated a third version of the first dataset, where the third version requires at least one cluster to store. It should be noted that the number of clusters required to store the third version of the first dataset is less than the number of clusters required to store the second version of the first dataset. In response, the data versioning component 216 scans the file 220D to determine whether the file 220D should be resized. As the file 220D has a sufficient number of clusters to store the third version of the dataset, the data versioning component 216 determines that the file 220D is of sufficient size. The data versioning component 216 then determines whether any of the clusters store obsolete data. In this regard, the data versioning component 216 determines that the first cluster 602 stores an obsolete dataset (e.g., the first version of the first dataset). The data versioning component 216 thus overwrites the first version of the first dataset with the third version of the first dataset. The data versioning component 216 also updates the cluster map 222 to associate the first cluster 602 of the file 220D as storing the most recent version of the first dataset.

Figure 6D:
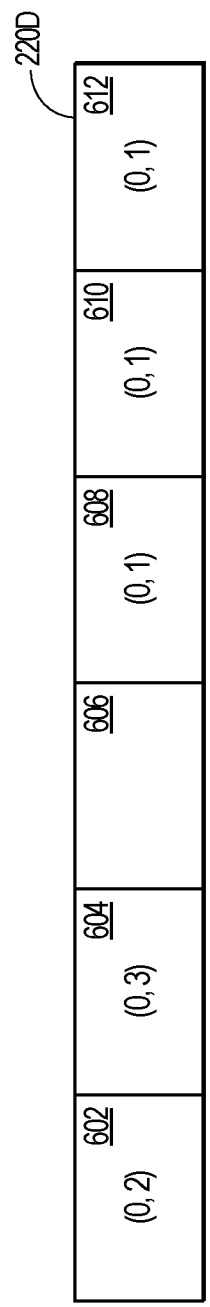

In FIG. 6D, the document application 212 receives a fourth version of the first dataset, where the fourth version requires at least one cluster to store. According, the data versioning component 216 determines whether the file 220D is of a sufficient size to store the fourth version of the first dataset and the third version of the first dataset. Determining that the file 220D contains a sufficient number of clusters (e.g., at least two clusters), the data versioning component 216 then scans the file 220D to determine whether there are available clusters to store the fourth version of the dataset. As the fourth version of the dataset is smaller than the second version of the dataset, the data versioning component 216 determines that the file 220D can be safely resized to accommodate both the third version of the first dataset and the fourth version of the dataset. Furthermore, the data versioning component 216 queries each of the clusters 602-612 to determine whether any of the clusters are available to store the fourth version of the first dataset. In response to the query, the data versioning component 216 determines that the second cluster 604 is empty and/or contains a NULL value. The data versioning component 216 thus writes the fourth version of the first dataset to the second cluster 604. The data versioning component 216 also updates the cluster map 222 to associate the second cluster 604 of the file 220D as storing the most recent version of the first dataset.

Figure 6E:
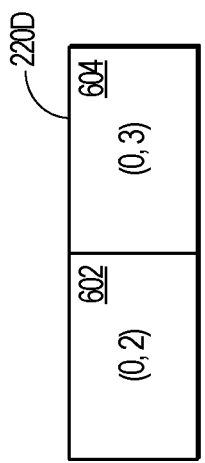

In FIG. 6E, the data versioning component resizes the file 220D to include a sufficient number of clusters (e.g., two clusters 602-604) to accommodate the third version of the first dataset and the fourth version of the first dataset. Accordingly, the data versioning component 216 may delete (or otherwise disassociate) the third, fourth, fifth, and sixth clusters 606-612 from the file 220D. For example, the data versioning component 216 may remove clusters 606-612 from the file 220D by shrinking the file size.

In one embodiment, removing a cluster from the file 220D includes writing in zero-bytes to the cluster. For example, where a particular version of the administrative data 218 is determined to be obsolete (e.g., within N−2 of the current version of the dataset), the data versioning component 216 is configured to erase (e.g., fill with zero-bytes) the first clusters of all previous generations for that cluster ID. The result of this operation is that the clusters are rendered unreadable and, effectively, removes that cluster ID from the file.

Figure 7:
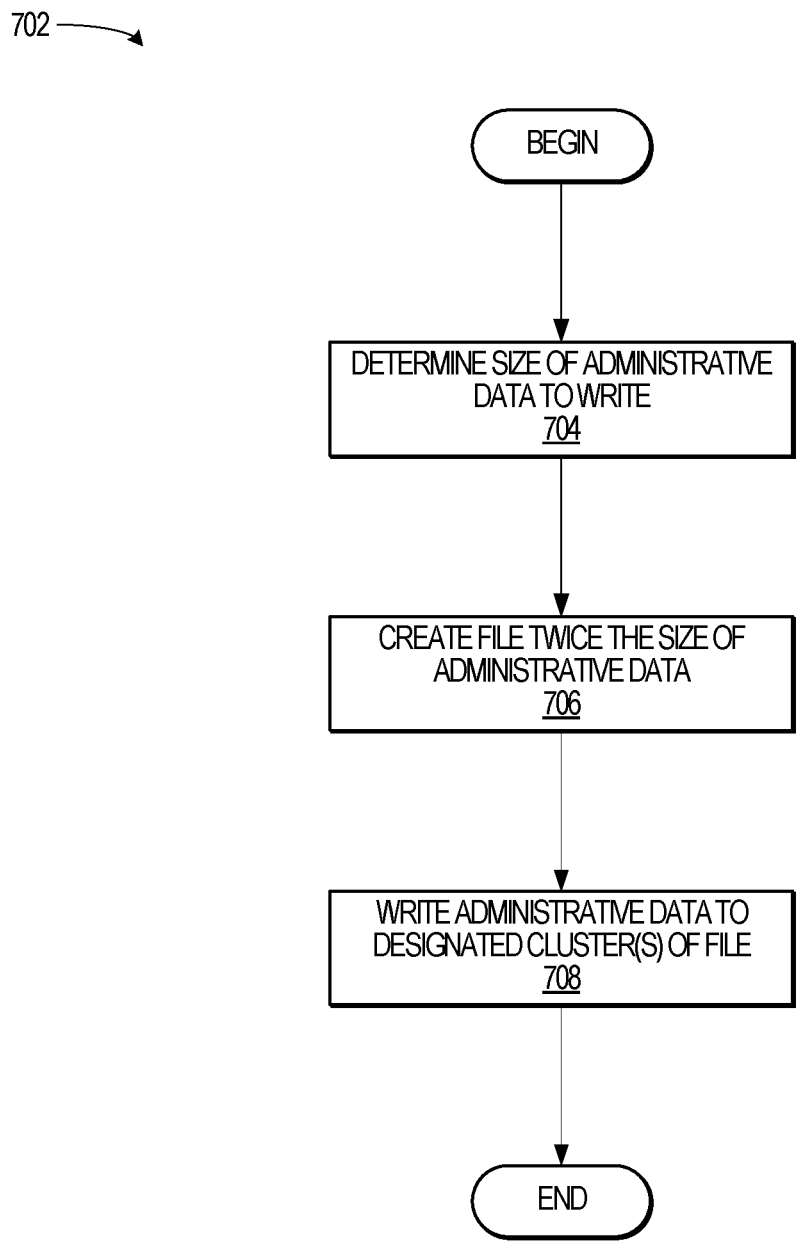
FIG. 7 illustrates a method, in accordance with an example embodiment, for creating a new file for storing a dataset.

FIG. 7 illustrates a method 702, in accordance with an example embodiment, for creating a new file for storing a dataset. The method 702 may be implemented by one or more of the components shown in FIG. 2 and is discussed by way of reference thereto.

Referring initially to Operation 704, the data versioning component 216 determines the size of the administrative data 218 that will be written to a file (Operation 704). At Operation 706, the data versioning component 216 generates a file having a configured size to accommodate the administrative data 218 and one or more subsequent versions of the administrative data 218 (Operation 706). In one embodiment, the data versioning component 216 generates a file having twice the number of clusters that is needed to store the administrative data 218. The data versioning component 216 then writes the administrative 218 to the available clusters of the generated file (Operation 708).

Figure 8:
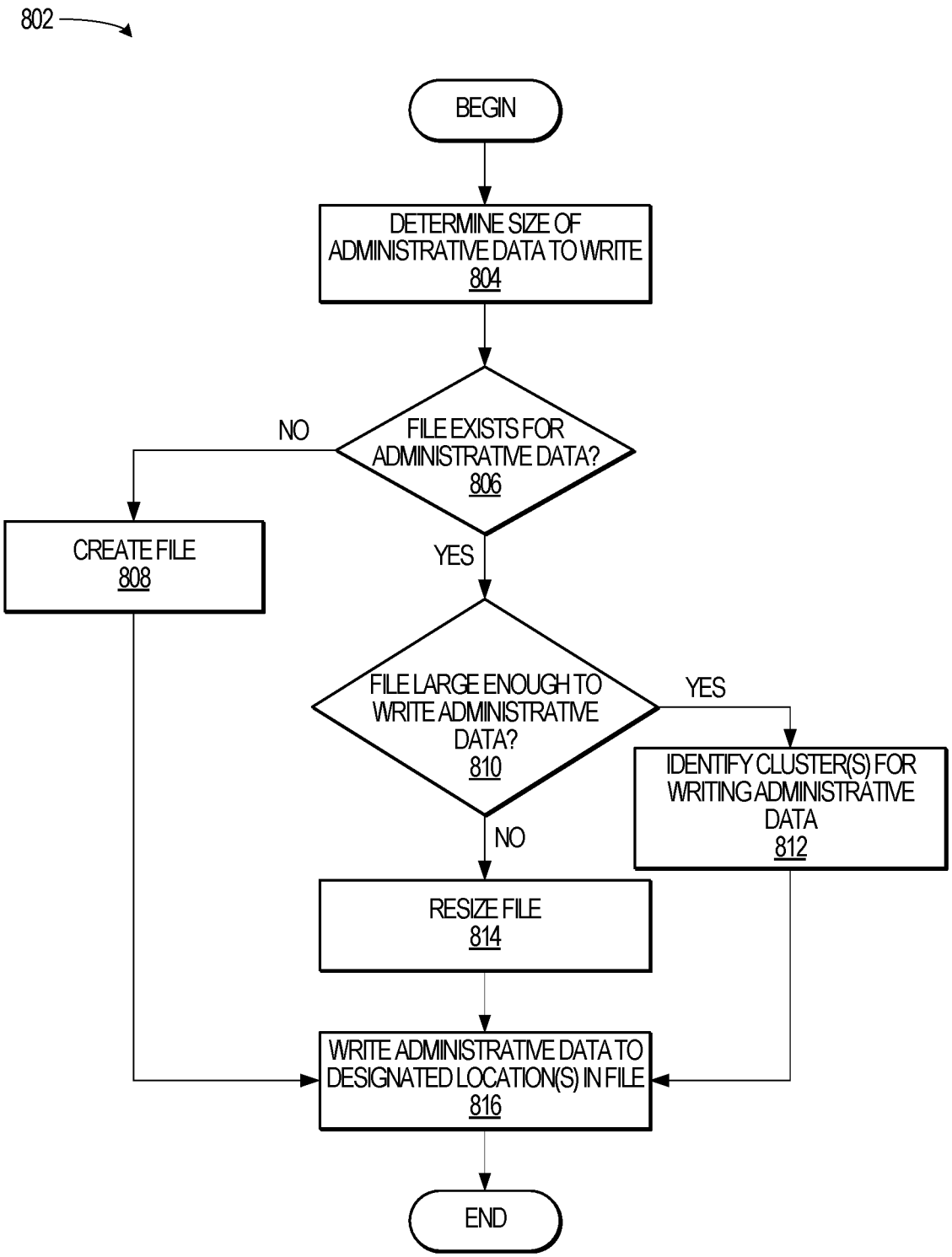
FIG. 8 illustrates a method, in accordance with an example embodiment, for updating a file with an updated dataset.

FIG. 8 illustrates a method 802, in accordance with an example embodiment, for updating a file with an updated dataset. The method 802 may be implemented by one or more of the components shown in FIG. 2 and is discussed by way of reference thereto.

Initially, the data versioning component 216 determines the size of the administrative data 218 to write (Operation 804). The data versioning component 216 then determines whether a file exists for storing the administrative data 218 (Operation 806). Where the data versioning component 216 makes this determination in the negative (e.g., the "NO" branch of Operation 806), the data versioning component 216 creates a file to store the administrative data 218 (Operation 808). Alternatively, where the data versioning component 216 determines that a file exists for storing the administrative data 218 (e.g., the "YES" branch of Operation 806), the data versioning component 216 then determines whether the preexisting file is large enough (e.g., contains a sufficient number of clusters) to store the administrative data 218 (Operation 810).

Where the data versioning component 216 determines that the preexisting file does not contain a sufficient number of clusters (e.g., the "NO" branch of Operation 810), the data versioning component 216 resizes the file to accommodate the additional clusters required to store the administrative data 218 (Operation 814). The data versioning component 216 may then mark one or more of the newly created additional clusters as suitable for storing the administrative data 218. Alternatively, where the data versioning component 216 determines that the preexisting file does contain a sufficient number of clusters (e.g., the "YES" branch of Operation 810), the data versioning component 216 which of the clusters are suitable for storing the administrative data 218 (Operation 812). As illustrated in FIGS. 3A-6E, a cluster may be determined as being suitable where the cluster is empty or where the cluster stores an obsolete version of the administrative data to be written. At Operation 816, the data versioning component 216 then writes the administrative data 218 to the clusters that the data versioning component 216 has determined are suitable for storing the administrative data 218.

Figure 9:
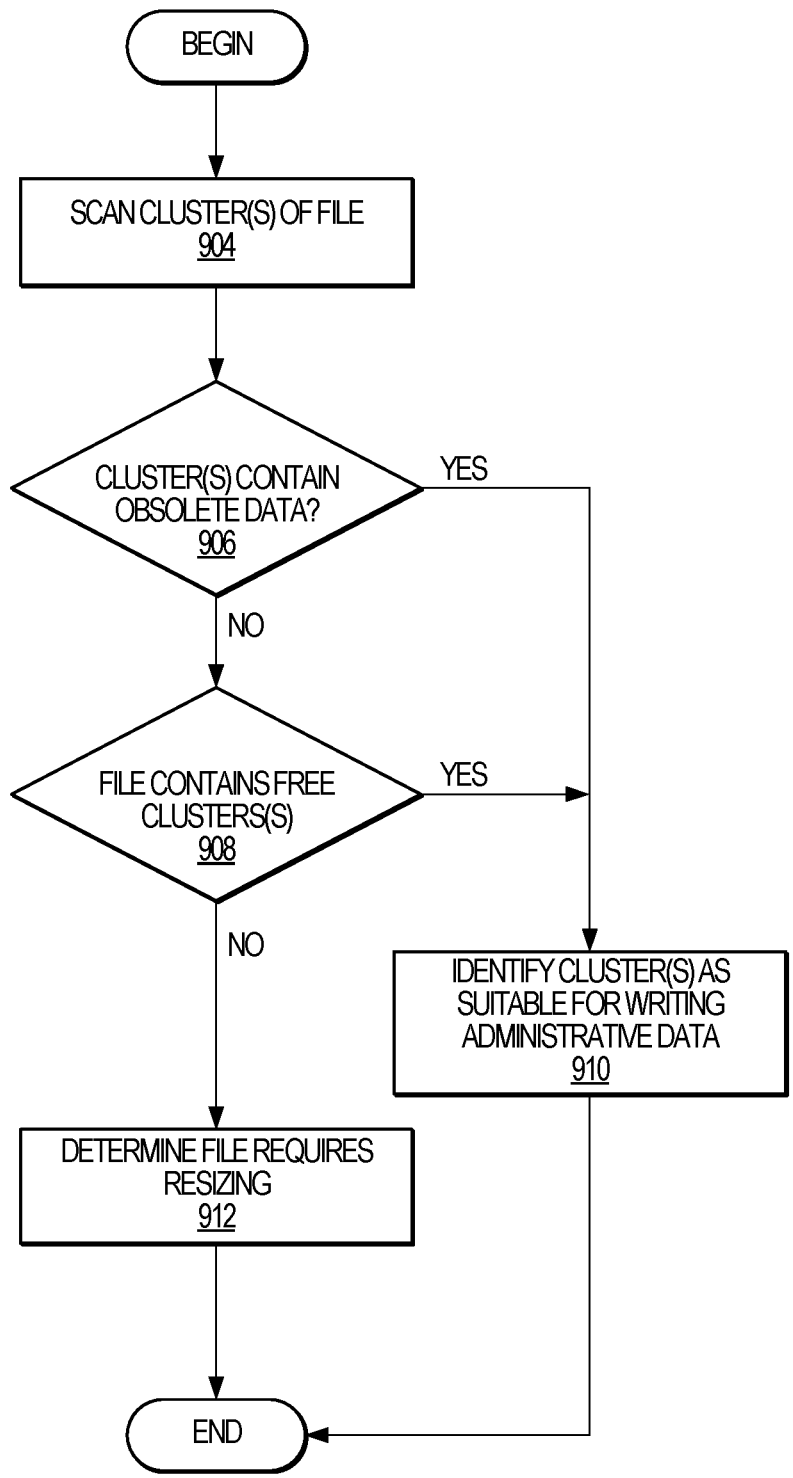
FIG. 9 illustrates a method, in accordance with an example embodiment, for determining whether a file includes clusters suitable for writing an updated dataset.

FIG. 9 illustrates a method 902, in accordance with an example embodiment, for determining whether a file includes clusters suitable for writing an updated dataset. The method 902 may be implemented by one or more of the components shown in FIG. 2 and is discussed by way of reference thereto. Furthermore, the method 902 may be invoked via one or more of the previously discussed Operations (e.g., via method 702 and/or method 802).

Initially, the data versioning component 216 scans the clusters of a file being used to store administrative data 218 (Operation 904). The data versioning component 216 determines whether one or more of the clusters includes obsolete administrative data (Operation 906). Where this determination is made in the affirmative (e.g., the "YES" branch of Operation 906), the data versioning component 216 identifies those clusters as being suitable for writing the administrative data 218 (Operation 910).

Alternatively, where Operation 906 is determined in the negative (e.g., the "NO" branch of Operation 906), the data versioning component 216 then determines whether the file contains a sufficient number of free (e.g., empty) clusters for storing the administrative data 218 (Operation 908). Where this determination is made in the affirmative (e.g., the "YES" branch of Operation 908), the data versioning component 216 identifies the free clusters as being suitable for storing the administrative data 218 (Operation 910). Alternatively, where this determination is made in the negative (e.g., the "NO" branch of Operation 908), the data versioning component 216 determines that the file requires resizing to accommodate the administrative data 218 (Operation 912). The resizing of the file may be performed in one or more of the previously discussed Operations (e.g., Operation 814).

In this manner, the disclosed systems and methods provide a mechanism to store administrative data required to access and/or retrieve a remotely stored electronic document, where accessing and storing the administrative data can be performed with a few number of I/O operations. By storing the administrative data in file clusters rather than in a third-party data storage solution (e.g., a data storage construct that is not integrated with the file system of the operation system), read and write times are significantly reduced. These reduced times have the technical benefit of reducing latency or other wait times for a user to access and/or retrieve a particular file being stored by a cloud computing service 110. Accordingly, the disclosed systems and methods provide improvements to the field of data storage solutions and, in particular, the manner in which data is efficiently stored in the clusters of a local file system.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 10:
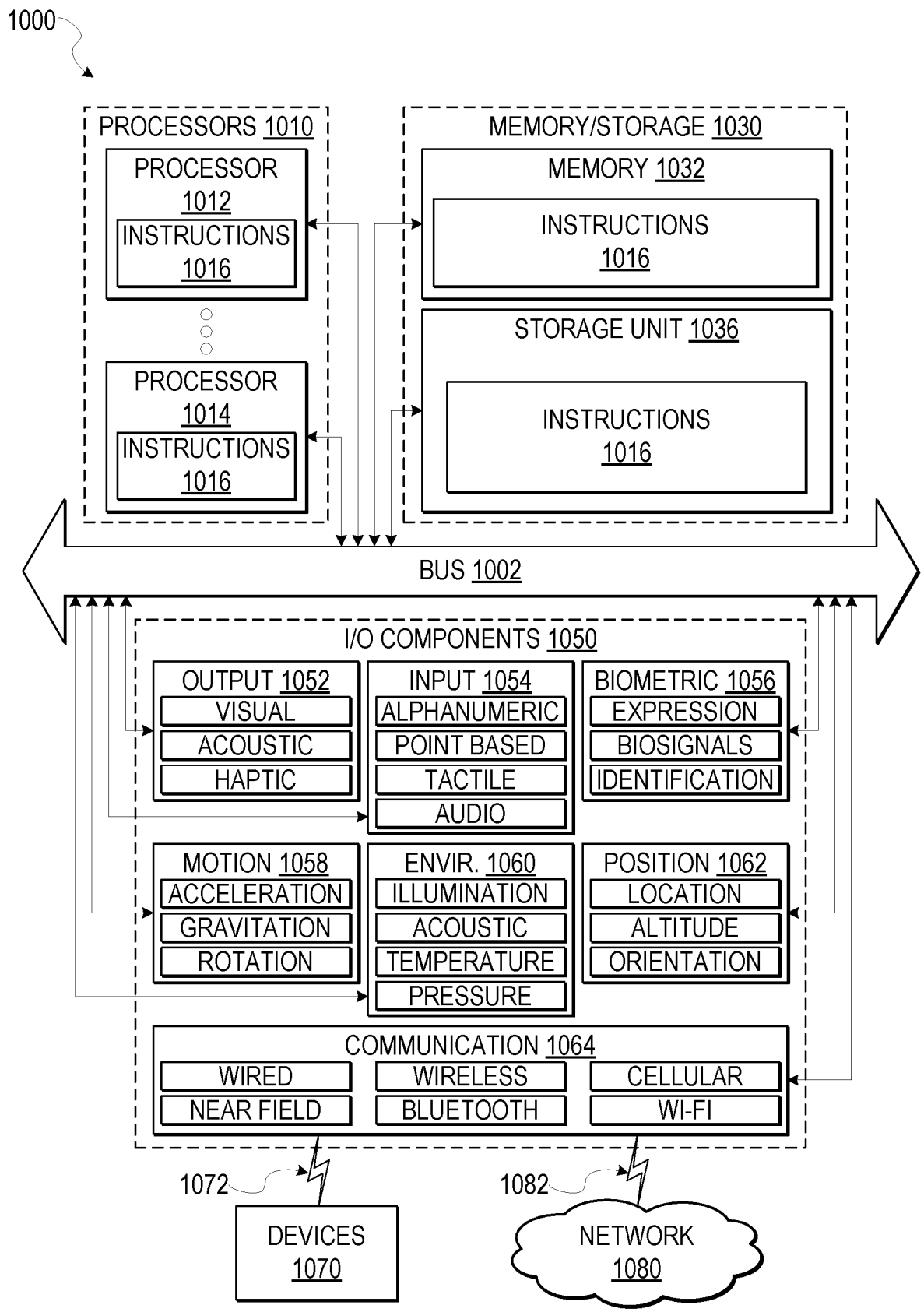
FIG. 10 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 10 is a block diagram illustrating components of a machine 1000, according to some example embodiments, able to read instructions from a machine-readable medium (e.g., a machine-readable storage medium or machine-readable storage device) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods illustrated in FIGS. 3A-10. Additionally, or alternatively, the instructions 1016 may implement one or more of the components of FIGS. 1-2. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a PDA, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1012 and processor 1014 that may execute the instructions 1016. The term "processor" is intended to include multi-core processor that may comprise two or more independent processors (sometimes referred to as "cores") that may execute instructions 1016 contemporaneously. Although FIG. 9 shows multiple processors 1010, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" includes a machine-readable storage device able to store instructions 1016 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 8. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).\

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method for versioning a dataset through file clustering, the method comprising:
   creating a file comprising a plurality of clusters, the file configured to store two versions of each dataset;
   writing a first version of a first dataset to a first cluster of the plurality of clusters;
   writing a first version number of the first dataset to the first cluster;
   receiving a first instruction to save a second version of the first dataset;
   writing a second version of the first dataset to a second duster of the plurality of clusters;
   writing a second version number to the second cluster that corresponds to the second version of the first dataset;
   receiving a second instruction to save a third version of the first dataset;
   in response to receiving the second instruction to save the third version, determining whether the first cluster or the second cluster contains a least recent version of the dataset based on a comparison of the first version number with the second version number;
   in response to a determination that the first version number is older than the second version number, writing the third version of the first dataset to the first cluster resulting in an overwrite of the first version of the first dataset while retaining the second version of the first dataset in the second cluster; and
   writing a third version number to the first cluster corresponding to the third version of the first dataset.

2. The method of claim 1, further comprising:
   determining whether the second cluster is an unused cluster of the plurality of clusters, wherein
   writing the second version of the first dataset to the second cluster of the plurality of clusters is based on the determining that the second cluster is an unused cluster of the plurality of clusters.

3. The method of claim 1, wherein creating the file comprises creating the file having a file size that is based on a multiple of the size of the first version of the first dataset.

4. The method of claim 1, further comprising:
   determining that the file does not have a sufficient number of free clusters for storing the third version of the first dataset; and
   resizing the file based on the determination that the file does not have a sufficient number of free clusters for storing the third version of the first dataset.

5. The method of claim 4, wherein resizing the file comprises deleting a cluster from the plurality of clusters.

6. The method of claim 4, wherein resizing the file comprises adding additional clusters to the plurality of clusters based on the size of the third version of the first dataset.

7. The method of claim 1, further comprising:
   writing a first version of a first portion of a second dataset to a third cluster of the plurality of clusters; and
   writing a first version of a second portion of the second dataset to a fourth cluster of the plurality of clusters, wherein
   the third cluster and the fourth cluster are contiguous clusters within the file.

8. A system for versioning a dataset through file clustering, the system comprising:
   a computer storage device storing computer-executable instructions; and
   a processor in communication with the computer storage device that, having executed the computer-executable instructions, configures the system to perform a plurality of operations comprising:
   creating a file comprising a plurality of clusters, the file configured to store two versions of each dataset;
   writing a first version of a first dataset to a first cluster of the plurality of clusters;
   writing a first version number of the first dataset to the first cluster;
   receiving a first instruction to save a second version of the first dataset;
   writing a second version of the first dataset to a second cluster of the plurality of clusters;
   writing a second version number to the second cluster that corresponds to the second version of the first dataset;
   receiving a second instruction to save a third version of the first dataset;
   in response to receiving the second instruction to save the third version, determining whether the first cluster or the second cluster contains a least recent version of the dataset based on a comparison of the first version number with the second version number;
   in response to a determination that the first version number is older than the second version number, writing the third version of the first dataset to the first cluster resulting in an overwrite of the first version of the first dataset while retaining the second version of the first dataset in the second cluster; and
   writing a third version number to the first cluster corresponding to the third version of the first dataset.

9. The system of claim 8, wherein the plurality of operations further comprises:
   determining whether the second cluster is an unused cluster of the plurality of clusters, wherein
   writing the second version of the first dataset to the second cluster of the plurality of clusters is based on the determining that the second cluster is an unused cluster of the plurality of clusters.

10. The system of claim 8, wherein creating the file comprises creating the file having a file size that is based on a multiple of the size of the first version of the first dataset.

11. The system of claim 8, wherein the plurality of operations further comprises:
   determining that the file does not have a sufficient number of free clusters for storing the third version of the first dataset; and
   resizing the file based on the determination that the file does not have a sufficient number of free clusters for storing the third version of the first dataset.

12. The system of claim 11, wherein resizing the file comprises deleting a cluster from the plurality of clusters.

13. The system of claim 11, wherein resizing the file comprises adding additional clusters to the plurality of clusters based on the size of the third version of the first dataset.

14. The system of claim 8, wherein the plurality of operations further comprises:
- writing a first version of a first portion of a second dataset to a third cluster of the plurality of clusters; and
- writing a first version of a second portion of the second dataset to a fourth cluster of the plurality of clusters, wherein
- the third cluster and the fourth cluster are contiguous clusters within the file.

15. A computer storage device having computer-executable instructions stored thereon that, when executed by a processor, cause a computer to perform a plurality of operations comprising:
- creating a file comprising a plurality of clusters, the file configured to store two versions of each dataset;
- writing a first version of a first dataset to a first cluster of the plurality of clusters;
- writing a first version number of the first dataset to the first cluster;
- receiving a first instruction to save a second version of the first dataset;
- writing a second version of the first dataset to a second cluster of the plurality of clusters;
- writing a second version number to the second cluster that corresponds to the second version of the first dataset;
- receiving a second instruction to save a third version of the first dataset;
- in response to receiving the second instruction to save the third version, determining whether the first cluster or the second cluster contains a least recent version of the dataset based on a comparison of the first version number with the second version number;
- in response to a determination that the first version number is older than the second version number, writing the third version of the first dataset to the first cluster resulting in an overwrite of the first version of the first dataset while retaining the second version of the first dataset in the second cluster; and
- writing a third version number to the first cluster corresponding to the third version of the first dataset.

16. The computer storage device of claim 15, wherein the plurality of operations further comprises:
- determining whether the second cluster is an unused cluster of the plurality of clusters, wherein
- writing the second version of the first dataset to the second cluster of the plurality of clusters is based on the determining that the second cluster is an unused cluster of the plurality of clusters.

17. The computer storage device of claim 15, wherein creating the file comprises creating the file having a file size that is based on a multiple of the size of the first version of the first dataset.

18. The computer storage device of claim 15, wherein the plurality of operations further comprises:
- determining that the file does not have a sufficient number of free clusters for storing the third version of the first dataset; and
- resizing the file based on the determination that the file does not have a sufficient number of free clusters for storing the third version of the first dataset.

19. The computer storage device of claim 18, wherein resizing the file comprises deleting a cluster from the plurality of clusters.

20. The computer storage device of claim 15, wherein the plurality of operations further comprises:
- writing a first version of a first portion of a second dataset to a third cluster of the plurality of clusters; and
- writing a first version of a second portion of the second dataset to a fourth cluster of the plurality of clusters; and wherein
- the third cluster and the fourth cluster are contiguous clusters within the file.

* * * * *